(12) United States Patent
Gong et al.

(10) Patent No.: US 10,318,005 B2
(45) Date of Patent: Jun. 11, 2019

(54) HAPTIC FEEDBACK MECHANISM FOR AN INTERACTIVE GARMENT

(71) Applicant: Google Inc., Mountain View, CA (US)

(72) Inventors: Nan-Wei Gong, Cambridge, MA (US); Mustafa Emre Karagozler, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 15/622,921

(22) Filed: Jun. 14, 2017

(65) Prior Publication Data

US 2018/0307315 A1 Oct. 25, 2018

Related U.S. Application Data

(60) Provisional application No. 62/372,670, filed on Aug. 9, 2016.

(51) Int. Cl.
| | |
|---|---|
| *G06F 3/01* | (2006.01) |
| *A41D 1/00* | (2018.01) |
| *G06F 3/044* | (2006.01) |
| *G08B 6/00* | (2006.01) |

(52) U.S. Cl.
CPC .............. *G06F 3/016* (2013.01); *A41D 1/005* (2013.01); *G06F 3/044* (2013.01); *G08B 6/00* (2013.01)

(58) Field of Classification Search
CPC ..... H04B 5/0031; H04W 84/12; H04W 88/08
See application file for complete search history.

(56) References Cited

U.S. PATENT DOCUMENTS

| | | | |
|---|---|---|---|
| 8,139,803 B2 | 3/2012 | Afshar | |
| 8,665,241 B2 | 3/2014 | Heubel et al. | |
| 10,150,043 B2* | 12/2018 | Zhang | ..................... A63F 13/95 |
| 2010/0079264 A1 | 4/2010 | Hoellwarth | |
| 2010/0141407 A1* | 6/2010 | Heubel | ................... G06F 1/163 |
| | | | 340/407.1 |
| 2014/0070957 A1 | 3/2014 | Longinotti-Buitoni et al. | |

(Continued)

FOREIGN PATENT DOCUMENTS

| | | |
|---|---|---|
| EP | 2796964 | 10/2014 |
| WO | 2011055326 | 5/2011 |
| WO | 2015038684 | 3/2015 |
| WO | 2016114487 | 7/2016 |

OTHER PUBLICATIONS

"Combined Search and Examination Report", GB Application No. 1712502.2, dated Oct. 17, 2017, 7 pages.

(Continued)

*Primary Examiner* — Chun-Nan Lin
(74) *Attorney, Agent, or Firm* — Colby Nipper

(57) ABSTRACT

This document describes techniques using, and objects embodying, a haptic feedback mechanism for an interactive garment. A wearable interactive garment (e.g., a jacket, shirt, or pants) may include various sensors that can sense user interactions in the form of single or multi-touch-input (e.g., gestures). A haptic feedback mechanism is integrated within the interactive garment and includes a vibration source (e.g., a vibration motor) and a transmission structure coupled to the vibration source. A controller is configured to control the haptic feedback mechanism to provide haptic feedback by causing the vibration source to distribute vibration to multiple vibration points within the transmission structure.

20 Claims, 7 Drawing Sheets

(56) References Cited

U.S. PATENT DOCUMENTS

| | | | |
|---|---|---|---|
| 2014/0135960 A1* | 5/2014 | Choi | A61B 5/0205 700/91 |
| 2015/0355710 A1* | 12/2015 | Modarres | G09G 5/003 345/173 |
| 2016/0048235 A1 | 2/2016 | Poupyrev | |
| 2016/0174626 A1* | 6/2016 | Mazzarolo | A41D 13/018 2/455 |
| 2017/0038897 A1* | 2/2017 | Park | G06F 3/0416 |
| 2017/0098353 A1* | 4/2017 | Ekambaram | G08B 13/14 |
| 2017/0249810 A1* | 8/2017 | Zerick | G08B 6/00 |
| 2017/0315616 A1* | 11/2017 | Kim | G06F 3/03543 |
| 2018/0000367 A1* | 1/2018 | Longinotti-Buitoni | A41D 13/1281 |
| 2018/0241864 A1* | 8/2018 | Males | H04W 4/021 |

OTHER PUBLICATIONS

"International Search Report and Written Opinion", PCT Application No. PCT/US2017/045769, dated Nov. 23, 2017, 11 pages.

Jones, et al., "Development of a Tactile Vest", As cited in PCT Search Report for PCT/US2017/045769 dated Nov. 23, 2017; Haptic Interfaces for Virtual Environment and Teleoperator Systems, 20 04. Haptics '04; Proceedings, 12th International Symposium on Chicago, IL, USA, Mar. 27-28, 2004, pp. 82-89.

"Written Opinion", PCT Application No. PCT/US2017/045769, dated Jul. 18, 2018, 7 pages.

"International Preliminary Report on Patentability", PCT Application No. PCT/US2017/045769, dated Nov. 29, 2018, 9 pages.

* cited by examiner

HAPTIC FEEDBACK MECHANISM FOR AN INTERACTIVE GARMENT

BACKGROUND

Mobile devices, while useful, are not always easy to integrate into real life. Wearable computing, including smart clothing, may be easier to integrate into real life uses, but conventional solutions often lack good functionality, are difficult to manufacture, and may lack durability. Such wearable devices may include haptic feedback components that provide haptic feedback by vibrating. However, conventional haptic feedback components often provide a single vibration point that may not be felt by the user. For example, if the vibration point is integrated into the sleeve or cuff of a jacket, vibration at the single vibration point may not be felt by the user if the sleeve is hanging off of the user's arm, or the vibration must be so strong that the user can feel the vibration. However, increasing the power of the vibration source requires significant battery power. Another way to increase the likelihood of the vibration being felt by the user, is to utilize multiple vibration motors to increase the number of vibration points. However, providing multiple points of vibration using conventional vibration components requires significant battery power in order to power each individual vibration motor.

SUMMARY

This document describes techniques using, and objects embodying, a haptic feedback mechanism for an interactive garment. A wearable interactive garment (e.g., a jacket, shirt, or pants) may include various sensors that can sense user interactions in the form of single or multi-touch-input (e.g., gestures). A haptic feedback mechanism is integrated within the interactive garment and includes a vibration source (e.g., a vibration motor) and a mechanical transmission structure coupled to the vibration source. A controller is configured to control the haptic feedback mechanism to provide haptic feedback by causing the vibration source to distribute vibration to multiple vibration points within the transmission structure.

This summary is provided to introduce simplified concepts concerning a haptic feedback mechanism for an interactive fabric, which is further described below in the Detailed Description. This summary is not intended to identify essential features of the claimed subject matter, nor is it intended for use in determining the scope of the claimed subject matter.

BRIEF DESCRIPTION OF THE DRAWINGS

Embodiments of techniques and devices for a haptic feedback mechanism for an interactive garment are described with reference to the following drawings. The same numbers are used throughout the drawings to reference like features and components.

DETAILED DESCRIPTION

Overview

Figure 1:
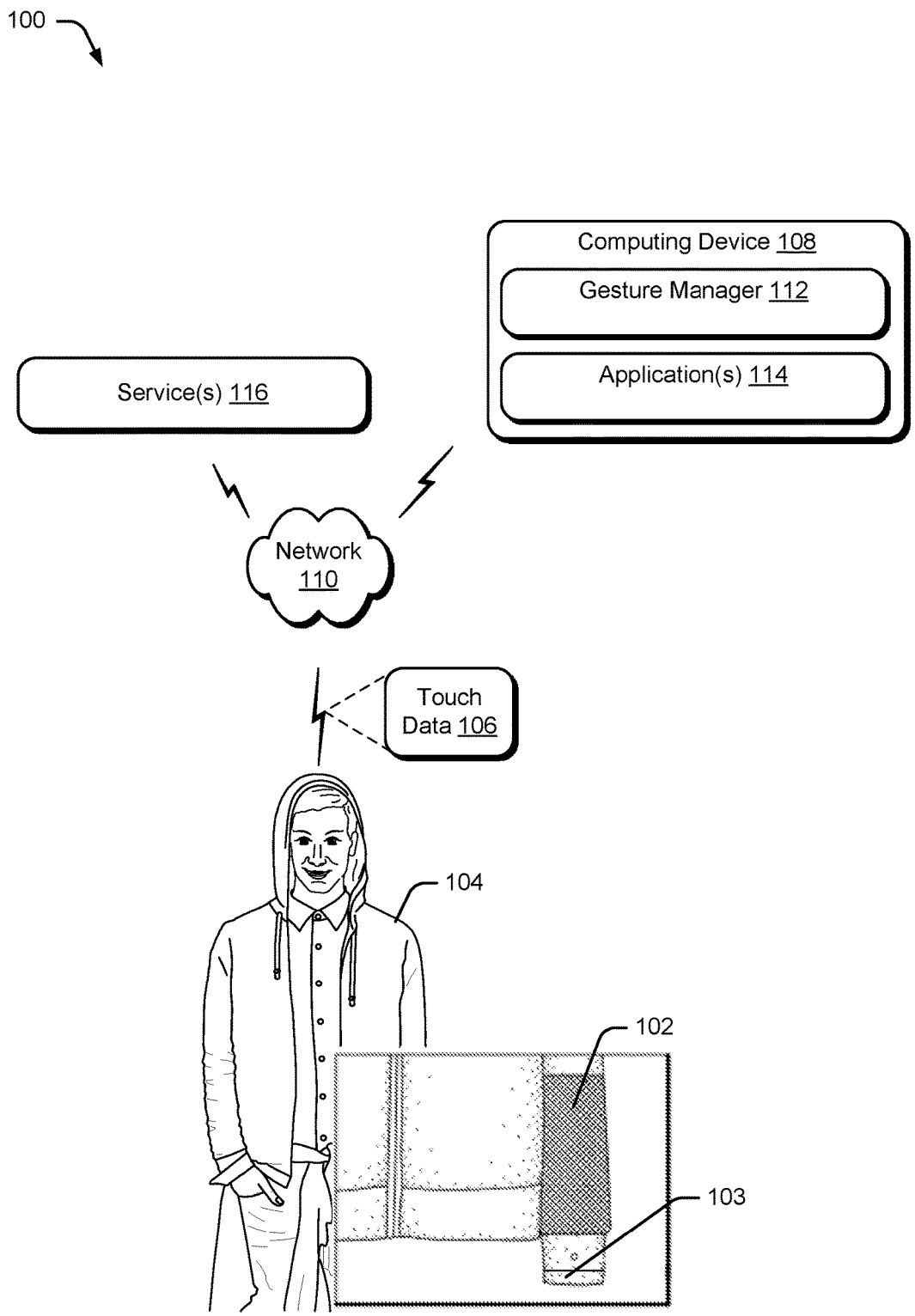
FIG. 1 is an illustration of an example environment in which a haptic feedback mechanism for an interactive garment can be implemented.

This document describes techniques using, and objects embodying, a haptic feedback mechanism for an interactive garment. A wearable interactive garment (e.g., a jacket, shirt, or pants) may include various sensors that can sense user interactions in the form of single or multi-touch-input (e.g., gestures). A haptic feedback mechanism is integrated within the interactive garment and includes a vibration source (e.g., a directional vibration motor) and a mechanical transmission structure coupled to the vibration source. A controller is configured to control the haptic feedback mechanism to provide haptic feedback by causing the vibration source to distribute vibration to multiple vibration points within the transmission structure. In some cases, the vibration source may be a directional vibration source, but the transmission structure can be multi-directional. Therefore, the haptic feedback mechanism enables multi-directional vibration that is powered by a directional vibration source.

The haptic feedback may be provided, for example, to indicate to the user that a particular user interaction with the interactive garment was detected or to provide a notification to the user. For example, the haptic feedback mechanism may vibrate once to indicate that user input to the interactive garment has been received or recognized, and vibrate twice to indicate that a text message has been received at a smartphone paired with the interactive garment.

Distributing vibration from a single vibration source to multiple vibration points throughout the interactive garment increases the likelihood that the user will feel the vibration. For example, if multiple vibration points are provided around the cuff of a jacket, at least one of the vibration points will be touching the user's wrist when the vibration occurs. Notably, the haptic feedback mechanism described herein requires much lower power consumption than conventional solutions because just a single vibration source is powered by the battery, and the vibration is then distributed by the mechanical transmission structure which requires no additional power.

The haptic feedback mechanism may be implemented in a variety of different ways. In one or more implementations, the vibration source is coupled to a transmission structure that is rigid or stiff along a first vibrating axis, but is flexible along a non-vibrating axis. The vibration source is configured to distribute vibration to the transmission structure along the vibrating axis, which causes the vibrating axis to vibrate as a rigid body. However, the flexibility of the transmission structure allows the transmission structure to be easily integrated into the interactive garment, such as by being placed around the cuff of a sleeve of a shirt or jacket.

In a second implementation, the vibration source is coupled to a transmission cable (e.g., a resonant cable) having attached weights. The transmission cable is attached to the interactive garment at multiple attachment points, and the weights are attached to the cable at portions of the cable that are not attached to the garment. The vibration source is configured to distribute vibration to the transmission cable, which causes the transmission cable to vibrate such that the multiple attached weights vibrate at the multiple vibration points.

Example Environment

FIG. 1 is an illustration of an example environment 100 in which a haptic feedback mechanism for an interactive garment can be implemented. Environment 100 includes an interactive fabric 102, which is shown as being integrated within an interactive garment 104, which in this example is illustrated as a jacket. In environment 100, interactive fabric 102 is illustrated as being integrated into the sleeve of interactive garment 104. Notably, however, interactive fabric 102 may be integrated at any location on interactive garment 104. Interactive fabric 102 is a fabric or textile that is configured to sense multi-touch input. As described herein, interactive fabric 102 may include any type of fabric, textile, or flexible woven material consisting of a network of natural or artificial fibers, often referred to as thread or yarn.

While interactive fabric 102 is illustrated as being integrated within a jacket, it is to be appreciated that interactive fabric 102 may be integrated within any type of flexible object made from fabric or a similar flexible material, such as articles of clothing, hats, handbags, blankets, shower curtains, towels, sheets, bed spreads, or fabric casings of furniture, to name just a few. As discussed in more detail below, interactive fabric 102 may be integrated within interactive garment 104 in a variety of different ways, including weaving, sewing, gluing, and so forth. In some cases, other types of sensors may be integrated within interactive garment 104 in place of, or in combination with, interactive fabric 102.

Interactive garment 104 is configured to detect user interactions (e.g., one or more gestures) from a user, and to generate touch data 106 representative of the user interactions. Interactive garment 104 may also include one or more output devices 103, such as light sources (e.g., LEDs), speakers, displays (e.g., flexible organic displays), shape changing materials, or vibration components. The output devices 103 can be controlled to provide feedback to the user, such as by providing a visual, audio, and/or haptic output (e.g., flashing light, beeping, or vibrating) indicating that a particular user interaction was detected. In addition, the output devices 103 may be controlled to provide a notification to the user, such as by flashing, vibrating, or beeping to indicate that a text message has been received at a smartphone paired with the interactive garment 104. As will be discussed in more detail below, in one or more implementation output device 103 includes a haptic feedback mechanism that is configured to utilize a single vibration source to provide multiple vibration points in interactive garment 104.

In some cases, the interactive garment 104 may include processing capability to recognize the user interaction, and to initiate a particular functionality associated with the user interaction. In other cases, the touch data 106, representative of the user interactions, may be communicated to a computing device 108 via a network 110. Receipt of the touch data, causes a gesture manager 112, implemented at computing device 108, to analyze the touch data 106 to determine whether the touch data corresponds to (e.g., is mapped to) a user interaction or gesture to initiate a particular functionality or perform a particular operation. For example, a user gesture (e.g., a swipe) to interactive fabric 102 can be configured to trigger various types of functionality, such as answering a phone call, saving the user's current geographical location, playing a song, and so forth.

In various implementation, gesture manager 112 is configured to interface with one or more applications 114 and/or services 116, which may be implemented at computing device 108, or partially implemented at computing device 108 and partially implemented as a remote service (e.g., a cloud-based service) that is remote from computing device 108. Consider, for example, that a fitness-based application 114 may be implemented at device 108 which is being worn, held, or otherwise attached to the user (e.g., a smartphone or smartwatch). In this case, the application 114 at the computing device 108 may perform various functions based on the touch data 106, such as logging workout results, nutrition information, and so forth. In addition, the application 114 may present a user interface that provides the user's diet and fitness results. The application 114 may communicate with a remote service 116, which may store the fitness results, and perform other functions. By enabling an associated remote service to perform various processing tasks, the system saves processing resources at computing device 108 which conserves battery life.

Applications 114 and services 116 may include a variety of different types of applications or services, such as telephone services, messaging services (e.g., text messaging services, email services), map services, music services, and so forth. In addition, gesture manager 112 is configured to enable third-parties to develop applications 114 and services 116 that can interface with gesture manager 112. For example, gesture manager 112 may provide an infrastructure for developers by being configured to recognize various types of interactions with interactive fabric 102 and/or user contexts. Doing so enables developers to design applications 114 and services 116 to perform various functions based on the recognizable user interactions to interactive fabric 102.

Gesture manager 112, applications 114, and services 116, may be implemented by one or more computing devices, which may be configured in a variety of different ways. A computing device, for instance, may be configured as a desktop computer, a laptop computer, a mobile device (e.g., assuming a handheld configuration such as a tablet or mobile phone), and so forth. Thus, a computing device may range from full resource devices with substantial memory and processor resources (e.g., personal computers, game consoles) to a low-resource device with limited memory and/or processing resources (e.g., mobile devices). Additionally, although a single computing device is described in some instances, the computing device may be representative of a plurality of different devices, such as multiple servers utilized by a business to perform operations "over the cloud". In FIG. 1, application 114 is illustrated as being implemented at computing device 108 and service 116 is shown as being implemented remote from computing device 108. It is to be noted, however, that in some implementations application 114 may be implemented without service 116, or application 114 and service 116 may be implemented at a single device.

Network 110 includes one or more of many types of wireless or partly wireless communication networks, such as a local-area-network (LAN), a wireless local-area-network (WLAN), a personal-area-network (PAN), a wide-area-network (WAN), an intranet, the Internet, a peer-to-peer network, point-to-point network, a mesh network, and so forth.

Further, although a single network 110 is shown, network 110 may also be configured to include multiple networks. For example, interactive garment 104 and computing device 108 may be coupled via a first type of network 110 (e.g., a Bluetooth® network connection), and computing device 108 and service 116 be coupled via a second type of network 110 (e.g., the Internet).

Figure 2:
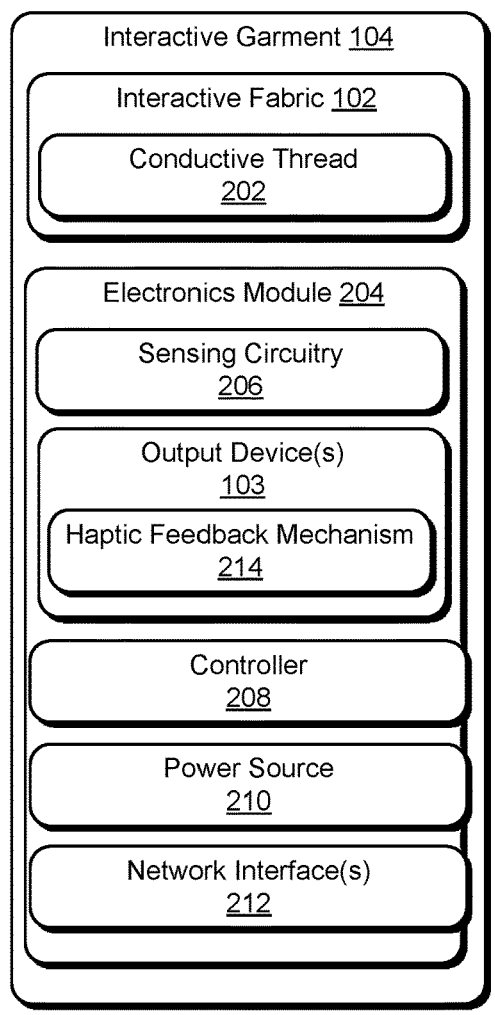
FIG. 2 illustrates an example system in which a haptic feedback mechanism for an interactive garment may be implemented.

In more detail, consider FIG. 2 which illustrates an example system 200 in which a haptic feedback mechanism for an interactive garment may be implemented. In system 200, interactive fabric 102 is integrated in interactive garment 104, which may be implemented as any type of flexible object (e.g., a jacket, shirt, hat, or handbag).

Interactive fabric 102 is configured to sense multi-touch-input from a user when one or more fingers of the user's hand touch interactive fabric 102. Interactive fabric 102 may also be configured to sense full-hand touch-input from a user, such as when an entire hand of the user touches or swipes interactive fabric 102. To enable the detection of touch-input, interactive fabric 102 includes conductive threads 202, which are integrated into interactive fabric 102 (e.g., by being woven into, or embroidered onto, interactive fabric 102) to form a touch sensor (e.g., a capacitive touch sensor). Notably, the conductive threads 202 do not alter the flexibility of interactive fabric 102, which enables interactive fabric 102 to be easily integrated within interactive garments 104.

In this example, interactive garment 104 also includes one or more electronics modules 204 configured to contain various electronic components, which are illustrated as including sensing circuitry 206, output devices 103, a controller 208, a power source 210, and network interfaces 212.

The sensing circuitry 206 is coupled to conductive thread 202 that is integrated with interactive fabric 102. For example, wires from the conductive threads 202 may be connected to sensing circuitry 206 using flexible PCB, creping, gluing with conductive glue, soldering, and so forth. Sensing circuitry 206 is configured to detect user interactions to interactive fabric 102, such as by detecting the location of the touch-input on conductive thread 202, as well as motion of the touch-input. For example, when an object, such as a user's finger, touches conductive thread 202, the position of the touch can be determined by sensing circuitry 206 by detecting a change in capacitance on the grid or array of conductive thread 202. The touch-input may then be used to generate touch data usable to control computing device 108. For example, the touch-input can be used to determine various gestures, such as single-finger touches (e.g., touches, taps, and holds), multi-finger touches (e.g., two-finger touches, two-finger taps, two-finger holds, and pinches), single-finger and multi-finger swipes (e.g., swipe up, swipe down, swipe left, swipe right), and full-hand interactions (e.g., touching the interactive fabric with a user's entire hand, covering the interactive fabric with the user's entire hand, pressing the interactive fabric with the user's entire hand, palm touches, and rolling, twisting, or rotating the user's hand while touching the interactive fabric).

Power source 210 may be coupled to sensing circuitry 206 to provide power to sensing circuitry 206 to enable the detection of touch-input, and may be implemented as a small battery. When touch-input is detected by sensing circuitry 206, data representative of the touch-input may be communicated to controller 208, which may be implemented as one or more microprocessors. Controller 208 may then analyze the touch-input data to generate touch data 106. Touch data 106 may then be communicated to gesture manager 112, which may be implemented at computing device 108 (e.g., a smart phone), via the network interface 212 to cause gesture manager 112 to initiate a particular functionality. Generally, network interfaces 212 are configured to communicate data, such as touch data 106, over wired, wireless, or optical networks to computing devices 108. By way of example and not limitation, network interfaces 212 may communicate data over a local-area-network (LAN), a wireless local-area-network (WLAN), a personal-area-network (PAN) (e.g., Bluetooth™), a wide-area-network (WAN), an intranet, the Internet, a peer-to-peer network, point-to-point network, a mesh network, and the like (e.g., through network 108 of FIG. 1).

Controller 208 may also be configured to control output devices 103 to provide feedback, or indicate a particular notification. In accordance with various implementations, output devices 103 include a haptic feedback mechanism 214. As discussed throughout, haptic feedback mechanism 214 is configured to provide haptic feedback by distributing vibration from a single vibration source to multiple vibration points within the interactive garment 104. A further discussion of haptic feedback mechanism 214 is provided below in the section titled "Haptic feedback mechanism".

In some cases, electronics module 204 includes an internal electronics module and an external electronics module. The internal electronics module may be embedded within interactive garment 104 and directly coupled to conductive threads 202. The internal electronics module may also be communicatively coupled to the external electronics module via a communication interface. The internal electronics module may contain a first subset of electronic components for the interactive garment 104, and the external electronics module may contain a second, different, subset of electronics components for the interactive garment 104. As described herein, the internal electronics module may be physically and permanently embedded within interactive garment 104, whereas the external electronics module may be removably coupled to interactive garment 104.

Figure 3:
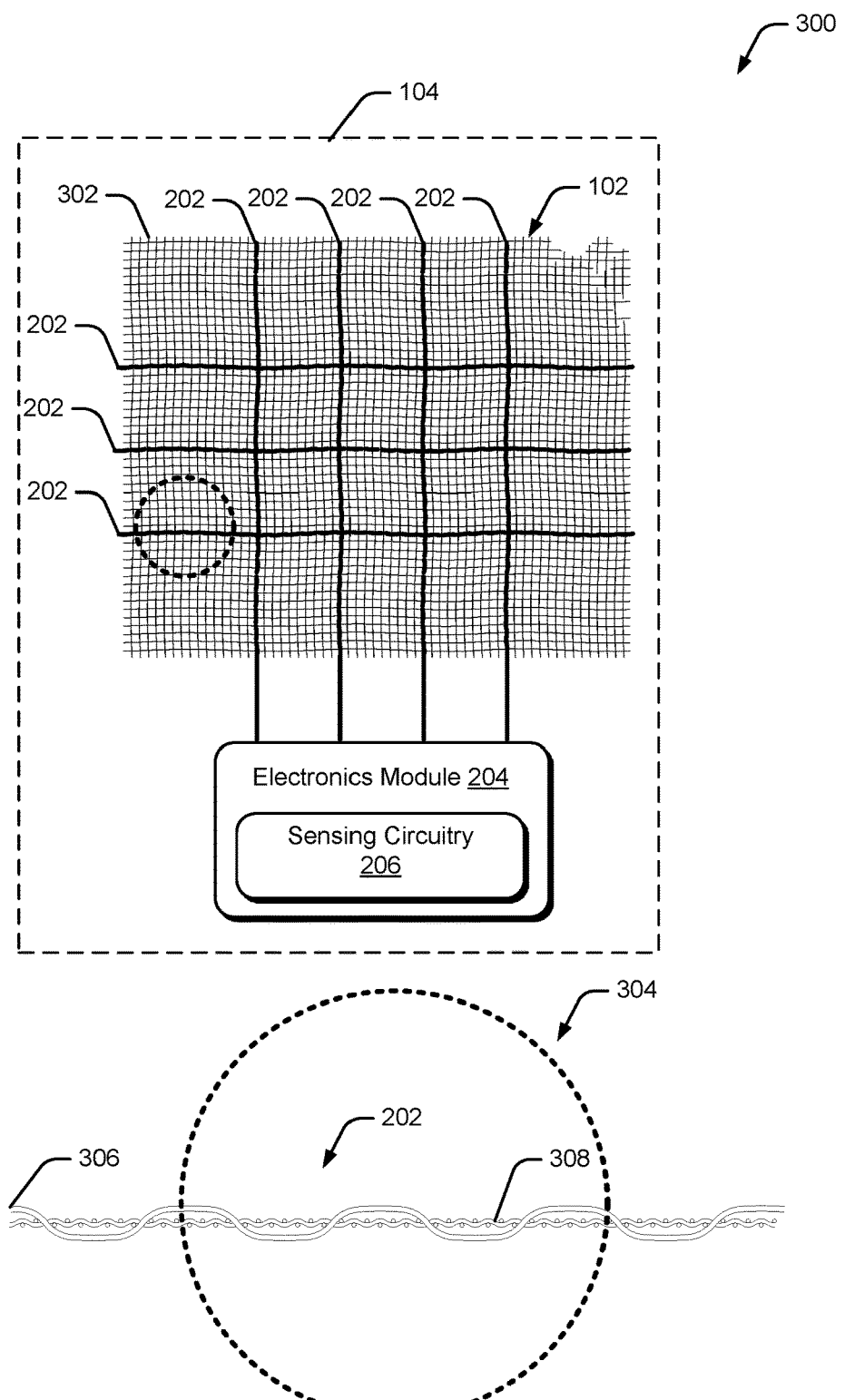
FIG. 3 illustrates an example of the interactive fabric in accordance with one or more implementations.

FIG. 3 illustrates an example 300 of interactive fabric 102 in accordance with one or more implementations. In this example, interactive fabric 102 of the interactive garment 104 includes non-conductive threads 302 woven with conductive threads 202 to form interactive fabric 102. Non-conductive threads 302 may correspond to any type of non-conductive thread, fiber, or fabric, such as cotton, wool, silk, nylon, polyester, cashmere, wool, and so forth. In some cases, rather than weaving conductive threads 202 with non-conductive threads 302, the conductive threads may be embroidered onto interactive fabric 102.

At 304, a zoomed-in view of conductive thread 202 is illustrated. Conductive thread 202 includes a conductive wire 306 that is twisted, braided, or wrapped with a flexible thread 308. Twisting conductive wire 306 with flexible thread 308 causes conductive thread 202 to be flexible and stretchy, which enables conductive thread 202 to be easily woven with non-conductive threads 302 to form interactive fabric 102, or embroidered onto interactive fabric 102.

In one or more implementations, conductive wire 306 is a thin copper wire. It is to be noted, however, that conductive wire 306 may also be implemented using any type of conductive material, such as silver, gold, materials coated with a conductive polymer, and so forth. Flexible thread 308 may be implemented as any type of flexible thread or fiber, such as cotton, wool, silk, nylon, or polyester, to name just a few.

In some cases, conductive thread 202 includes a conductive core that includes at least one conductive wire 306 (e.g., one or more copper wires) and a cover layer, configured to cover the conductive core, that is constructed from flexible threads 308. The conductive wire 306 of the conductive core may be insulated or not insulated.

In one or more implementations, the conductive core may be implemented using a single, straight, conductive wire 306. Alternately, the conductive core may be implemented using a conductive wire 306 and one or more flexible threads 308. For example, the conductive core may be formed by twisting one or more flexible threads 308 (e.g., silk threads, polyester threads, or cotton threads) with conductive wire 306 (e.g., as shown at 304 of FIG. 3), or by wrapping flexible threads 308 around conductive wire 306.

Conductive wire 306 may be insulated to prevent direct contact between crossing conductive threads 202. To do so, conductive wire 306 may be coated with a material such as enamel or nylon. Alternately, rather than insulating conductive wire 306, interactive textile may be generated with three separate textile layers to ensure that crossing conductive threads 202 do not make direct contact with each other.

Interactive fabric 102 can be formed cheaply and efficiently, using any conventional weaving process (e.g., jacquard weaving or 3D-weaving), which involves interlacing a set of longer threads (called the warp) with a set of crossing threads (called the weft). Weaving may be implemented on a conventional frame or machine known as a loom, of which there are a number of types. Thus, a loom can weave non-conductive threads 302 with conductive threads 202 to create interactive fabric 102.

In example 300, conductive thread 202 is woven into interactive fabric 102 to form a patch of conductive threads 202. In this example, the patch of conductive thread 202 is woven into interactive fabric 102 to form a grid that includes a set of substantially parallel conductive threads 202 and a second set of substantially parallel conductive threads 202 that crosses the first set of conductive threads to form the grid. The first set of conductive threads 202 are oriented horizontally and the second set of conductive threads 202 are oriented vertically, such that the first set of conductive threads 202 are positioned substantially orthogonal to the second set of conductive threads 202. It is to be appreciated, however, that conductive threads 202 may be oriented such that crossing conductive threads 202 are not orthogonal to each other. For example, the conductive threads 202 may be woven or embroidered in any type of shape or pattern, such as a circle, diamond, hexagon, to name just a few. While conductive threads 202 are illustrated as being spaced out from each other in FIG. 3, it is to be noted that conductive threads 202 may be weaved very closely together. For example, in some cases two or three conductive threads may be weaved closely together in each direction. Further, in some cases the conductive threads may be oriented as single-dimension sensing lines that do not cross or intersect with each other.

The patch of conductive thread 202 can be made to be visually or tactilely imperceptible to the user depending on the application and preferences. For example, in some cases the conductive thread 202 blends in with the fabric such that users are unable to tell that the patch includes conductive thread 202. Alternately, the conductive thread can be made to be visually or tactilely perceptible to users, such that the user can determine the location of the patch by looking at, or feeling, the conductive thread on interactive fabric 102.

In example 300, sensing circuitry 206 is shown as being integrated within interactive garment 104, and is directly connected to conductive threads 202. During operation, sensing circuitry 206 can determine positions of touch-input on the grid of conductive thread 202 using a variety of different sensing techniques, such as self-capacitance sensing or projective capacitive sensing.

For example, when configured as a self-capacitance sensor, sensing circuitry 206 can charge crossing conductive threads 202 (e.g., horizontal and vertical conductive threads) by applying a control signal (e.g., a sine signal) to each conductive thread 202. When an object, such as the user's finger, touches the grid of conductive thread 202, the conductive threads 202 that are touched are grounded, which changes the capacitance (e.g., increases or decreases the capacitance) on the touched conductive threads 202.

Sensing circuitry 206 uses the change in capacitance to identify the presence of the object. To do so, sensing circuitry 206 detects a position of the touch-input by detecting which horizontal conductive thread 202 is touched, and which vertical conductive thread 202 is touched by detecting changes in capacitance of each respective conductive thread 202. Sensing circuitry 206 uses the intersection of the crossing conductive threads 202 that are touched to determine the position of the touch-input on the grid of conductive threads 202. For example, sensing circuitry 206 can determine touch data by determining the position of each touch as X, Y coordinates on the grid of conductive thread 202.

When implemented as a self-capacitance sensor, "ghosting" may occur when multi-touch-input is received. Consider, for example, that a user touches the grid of conductive thread 202 with two fingers. When this occurs, sensing circuitry 206 determines X and Y coordinates for each of the two touches. However, sensing circuitry 206 may be unable to determine how to match each X coordinate to its corresponding Y coordinate. For example, if a first touch has the coordinates X1, Y1 and a second touch has the coordinates X4, Y4, sensing circuitry 206 may also detect "ghost" coordinates X1, Y4 and X4, Y1.

In one or more implementations, sensing circuitry 206 is configured to detect "areas" of touch-input corresponding to two or more touch-input points on the grid of conductive thread 202. Conductive threads 202 may be weaved closely together such that when an object touches the grid of conductive thread 202, the capacitance will be changed for multiple horizontal conductive threads 202 and/or multiple vertical conductive threads 202. For example, a single touch with a single finger may generate the coordinates X1, Y1 and X2, Y1. Thus, sensing circuitry 206 may be configured to detect touch-input if the capacitance is changed for multiple horizontal conductive threads 202 and/or multiple vertical conductive threads 202. Note that this removes the effect of ghosting because sensing circuitry 206 will not detect touch-input if two single-point touches are detected which are spaced apart.

Alternately, when implemented as a projective capacitance sensor, sensing circuitry 206 charges a single set of conductive threads 202 (e.g., horizontal conductive threads 202) by applying a control signal (e.g., a sine signal) to the single set of conductive threads 202. Then, sensing circuitry 206 senses changes in capacitance in the other set of conductive threads 202 (e.g., vertical conductive threads 202).

In this implementation, vertical conductive threads 202 are not charged and thus act as a virtual ground. However, when horizontal conductive threads 202 are charged, the horizontal conductive threads capacitively couple to vertical conductive threads 202. Thus, when an object, such as the user's finger, touches the grid of conductive thread 202, the capacitance changes on the vertical conductive threads (e.g., increases or decreases). Sensing circuitry 206 uses the change in capacitance on vertical conductive threads 202 to identify the presence of the object. To do so, sensing circuitry 206 detects a position of the touch-input by scanning vertical conductive threads 202 to detect changes in capacitance. Sensing circuitry 206 determines the position of the touch-input as the intersection point between the vertical conductive thread 202 with the changed capacitance, and the horizontal conductive thread 202 on which the control signal was transmitted. For example, sensing circuitry 206 can determine touch data by determining the position of each touch as X, Y coordinates on the grid of conductive thread 202.

Whether implemented as a self-capacitance sensor or a projective capacitance sensor, the conductive thread 202 and sensing circuitry 206 is configured to communicate the touch data that is representative of the detected touch-input to controller 208. Controller 208 may then cause communication of the touch data, via network interface 212, to gesture manager 112 to enable the gesture manager 112 to determine gestures based on the touch data, which can be used to control interactive garment 104, computing device 108, applications implemented at computing device 108, or other computing devices.

Gesture manager 112 can be implemented to recognize a variety of different types of gestures, such as touches, taps, swipes, holds, and covers made to interactive fabric 102. To recognize the various different types of gestures, gesture manager 112 can be configured to determine a duration of the touch, swipe, or hold (e.g., one second or two seconds), a number of the touches, swipes, or holds (e.g., a single tap, a double tap, or a triple tap), a number of fingers of the touch, swipe, or hold (e.g., a one finger-touch or swipe, a two-finger touch or swipe, or a three-finger touch or swipe), a frequency of the touch, and a dynamic direction of a touch or swipe (e.g., up, down, left, right). With regards to holds, gesture manager 112 can also determine an area of the conductive thread 202 that is being held (e.g., top, bottom, left, right, or top and bottom. Thus, gesture manager 112 can recognize a variety of different types of holds, such as a cover, a cover and hold, a five finger hold, a five finger cover and hold, a three finger pinch and hold, and so forth.

Notably, there may be a variety of different functionalities that the user may wish to initiate via a gesture to interactive fabric 102. However, there is a limited number of different gestures that a user can realistically be expected to remember. Thus, in one or more implementations gesture manager 112 is configured to select a functionality based on both user input to interactive fabric 102 and a context of the user or computing device 108. The ability to recognize gestures based on context enables the user to invoke a variety of different functionalities using a subset of gestures. For example, for a first context, a first gesture may initiate a first functionality, whereas for a second context, the same first gesture may initiate a second functionality.

In one or more implementations, the context may be determined based on data detected by other types of sensors. For example, sensors other than the interactive fabric 102 may be integrated within interactive garment 102, at computing device 108, and/or at another device that is communicably coupled to computing device 108. For example, gesture manager 112 may receive data from a fitness band worn by the user that tracks the number of steps that the user takes. Such sensors may include, by way of example and not limitation, an accelerometer, an internal measurement unit (IMU), a pedometer, and so forth.

The sensor data may be utilized by gesture manager 112 to determine a context of the user, such as an activity that the user is currently engaged in. For example, data from an IMU or an accelerometer may be utilized by gesture manager 112 to determine that the user is performing an activity such as running, riding a bike, working out, driving a car, and so forth. In this case, gesture manager 112 may initiate different functionalities based on the context. An IMU or integrated sensor could also be used to recognize when the interactive garment is being worn, or not worn, which may also change the resulting functionality.

In some cases, the context of computing device 108 may be based on an application that is currently running on computing device 108. For example, the context may correspond to listening to music when the user is utilizing a music player application to listen to music, and to "receiving a call" when a call is communicated to computing device 106. In these cases, gesture manager 112 can determine the context by determining the application that is currently running on computing device 108. Other non-limiting examples of determining context include determining the context based on calendar data (e.g., determining the user is in a meeting based on the user's calendar), determining context based on location data, and so forth.

Thus, gesture manager 112 may be implemented to initiate the functionality based on the touch-input as well as the context. For example, gesture manager 112 can compare a gesture to a mapping that assigns gestures to different contexts. A given gesture, for example, may be associated with multiple different contexts and associated functionalities. Thus, when a first gesture is received, gesture manager 112 may initiate a first functionality if a first context is detected, or initiate a second, different functionality if a second, different context is detected.

Haptic Feedback Mechanism

As discussed throughout, haptic feedback mechanism 214 is configured to provide haptic feedback by distributing vibration from a single vibration source to multiple vibration points within the interactive garment 104. A variety of different types of vibration may be used to provide the haptic feedback. In addition, the haptic feedback may be provided for a variety of different reasons, such as to provide feedback indicating sensor input from the user is detected, to notify the user of a particular event (e.g., a new text message or an incoming phone call), to provide realistic feedback for virtual reality or augmented reality uses, and so forth.

Unlike conventional vibration components, the haptic feedback mechanism 214 includes a single vibration source that distributes vibration from the vibration source throughout a mechanical transmission structure that is coupled to the vibration source. The received vibration from the vibration source causes the transmission structure to vibrate at multiple vibration points throughout interactive garment 104, thereby increasing the likelihood that the vibration is felt and recognized by a user wearing the interactive garment 104.

The vibration source may be implemented as any type of vibration source or motor, such as a linear resonant actuator or an eccentric rotating mass vibration motor, to name just a few. A linear resonant actuator contains a small internal mass attached to a string, which creates a force when driven. An eccentric rotating mass vibration motor uses a small unbalanced mass on a DC motor that rotates to create a force that translates to vibrations.

Notably, the transmission structure is mechanical, and thus does not require any power from power source 210 to operate. Thus, utilizing a single vibration source to provide multiple vibration points results in a significant power savings for the interactive garment 104, especially when compared to conventional solutions which may require a separate vibration source for each vibration point.

The transmission structure of haptic feedback mechanism 208 may be implemented in a variety of different ways. In one or more implementations, the vibration source is coupled to a rigid transmission structure that is rigid or stiff along a first vibrating axis, but flexible along a second non-vibrating axis. The vibration source is configured to distribute vibration to the rigid transmission structure along the vibrating axis, which causes the vibrating axis to vibrate as a rigid body.

Figure 4:
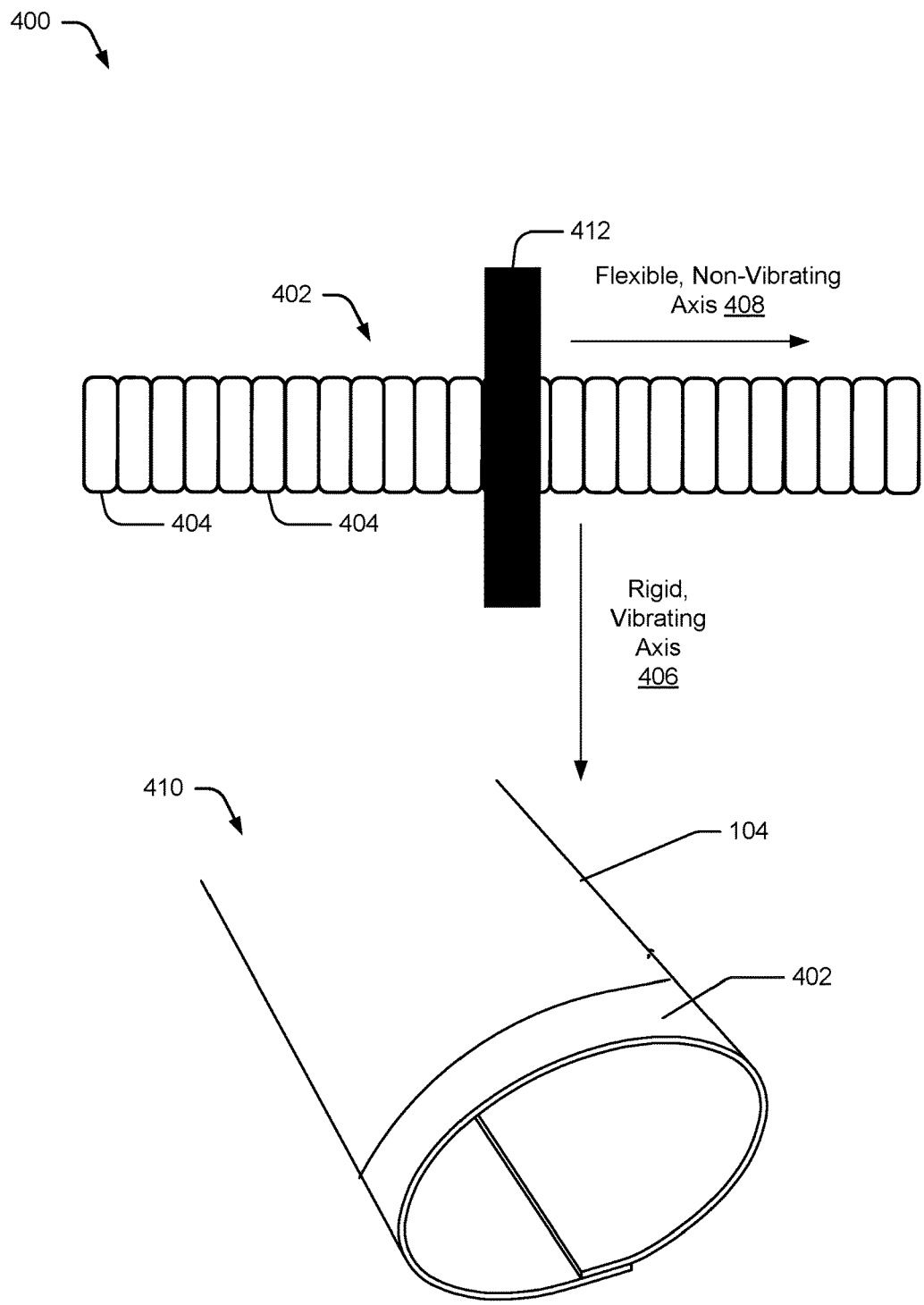
FIG. 4 illustrates an example of a haptic feedback mechanism when implemented with a vibration source and a rigid transmission structure.

Consider, for example, FIG. 4 which illustrates an example 400 of a haptic feedback mechanism when implemented with a vibration source and a rigid transmission structure. In this example, a rigid transmission structure 402 includes multiple rigid pieces 404 that are attached to each other. Rigid transmission structure 402, for example, may be similar to a watch band that includes multiple pieces. Each of the multiple rigid pieces 404 may be formed from various different types of material, such as plastics, metals, and so forth.

Notably, each of the rigid pieces 404 of rigid transmission structure 402 is rigid or stiff along a vibrating axis 406, but by coupling the pieces together, the structure itself is flexible along a non-vibrating axis 408. Due to this flexibility, the rigid transmission structure 402 may be integrated within interactive garment 104. As an example, at 410, rigid transmission structure 402 is shown as being implemented along the cuff of a sleeve of interactive garment 104. In this case, the rigid transmission structure 402 is not visible, as it is integrated within the cuff of the fabric of interactive garment 104.

A vibration source 412 is coupled to the rigid transmission structure 402, and is configured to provide vibration to the rigid transmission structure 402 along the vibrating access 406. Vibration source 412, for example, may be implemented as a linear resonant actuator vibrator and thus can be controlled to propagate the vibration to the rigid transmission structure 402 along the vibrating access 406. When vibration source 412 provides vibration to the rigid transmission structure 402, each of the individual pieces vibrate along the vibrating axis 406, and thus each individual piece creates a vibration point within interactive garment 104 that can be felt by the user wearing interactive garment 104.

As discussed throughout, controller 208 is configured to control vibration source 412 to vibrate, which causes the vibration to be distributed throughout the rigid transmission structure causing the rigid pieces to vibrate along the vibrating axis at the multiple vibration points.

Alternately, in one or more implementations, haptic feedback mechanism 214 is implemented by coupling a vibration source to a transmission cable. The transmission cable may have carefully tuned elastic and mass properties, such as a resonant cable that can bend in any direction and transmits radial vibration.

Figure 5:
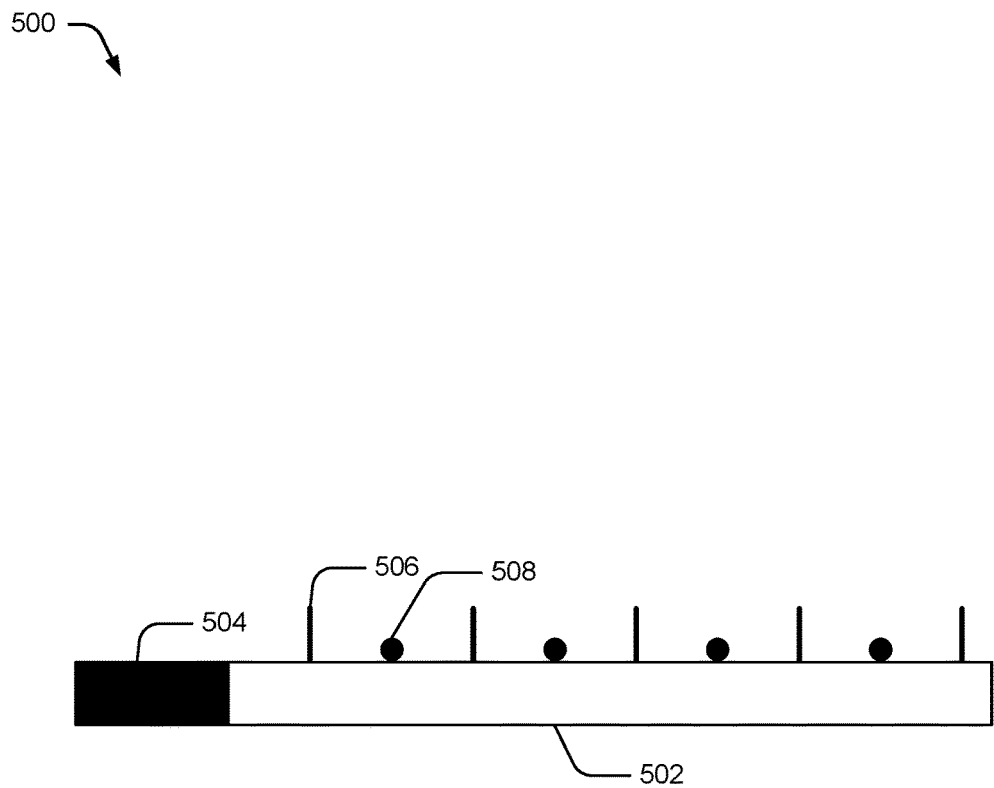
FIG. 5 illustrates an example of a haptic feedback mechanism when implemented with a vibration source and a transmission cable.

Consider, for example, FIG. 5 which illustrates an example 500 of a haptic feedback mechanism when implemented with a vibration source and a transmission cable. In this example, a transmission cable 502 is coupled to vibration source 504 and attached to the interactive garment 104 at multiple different attachment points 506. Weights 508 are attached to the transmission cable 502 between each pair of attachment points 506. As such, the weights 508 are not attached to the interactive garment 104 itself.

Vibration source 504 can be controlled to apply vibration to one end of transmission cable 502, which distributes the vibration along transmission cable 502. Doing so causes transmission cable 502 to oscillate (e.g., similar to a Sine wave), such that each of the weights 508 make contact with the user's body. Notably, because multiple weights 508 are used, the user is likely to feel the vibration because at least one of the weights will make contact with the user's body. For example, if the transmission cable 502 is implemented along the length of a sleeve of a shirt, at least one of the weights will make contact with the user's body even if a portion of the sleeve is drooping off of the user's arm. The transmission cable can be easily integrated into interactive garment 104, such as by knitting the transmission cable into interactive garment 104.

Controller 208 is configured to control vibration source 504 to vibrate, which causes the vibration to be distributed throughout the transmission cable 502 causing the weights to vibrate against the user's body at the multiple vibration points.

Example Methods

Figure 6:
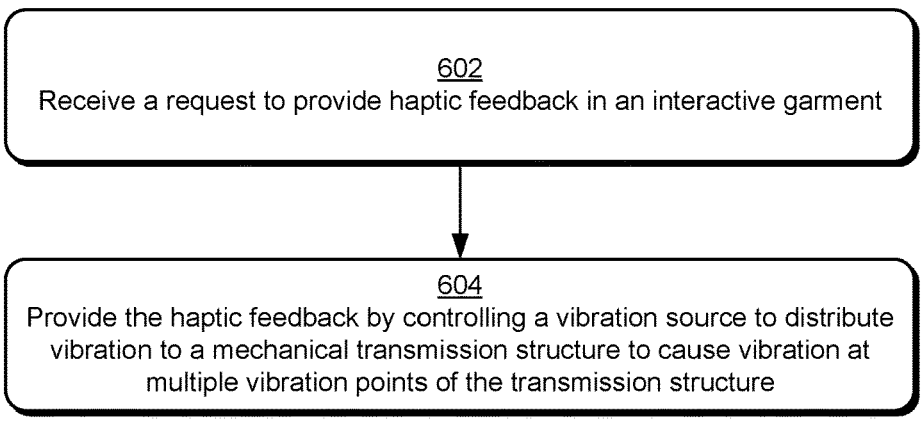
FIG. 6 illustrates an example method of controlling a haptic feedback mechanism to provide haptic feedback by vibrating at multiple vibration points.

FIG. 6 illustrates an example method 600 of controlling a haptic feedback mechanism to provide haptic feedback by vibrating at multiple vibration points. This method is shown as sets of blocks that specify operations performed but are not necessarily limited to the order or combinations shown for performing the operations by the respective blocks. The techniques are not limited to performance by one entity or multiple entities operating on one device.

At 602, a request is received to provide haptic feedback in an interactive garment. For example, controller 208 receives a request to provide haptic feedback in interactive garment 104. The request can be received for a variety of different reasons. For example, in some cases, the request is received in response to detection of touch-input to sensors integrated within the interactive garment. As another example, the request may be received in order to signal a notification, such as to indicate receipt of a new text-message or an incoming phone call.

At 604, the haptic feedback is provided by controlling a vibration source to distribute vibration to a transmission structure to cause vibration at multiple vibration points of the transmission structure. For example, in one or more implementations, controller 208 controls vibration source 412 to distribute vibration throughout rigid transmission structure 402 causing the rigid pieces to vibrate along the vibrating axis at the multiple vibration points. As another example, in one or more implementations, controller 208 is configured to control vibration source 504 to vibrate, which causes the vibration to be distributed throughout the transmission cable 502 causing weights 508 to vibrate against the user's body at the multiple vibration points.

Example Computing System

Figure 7:
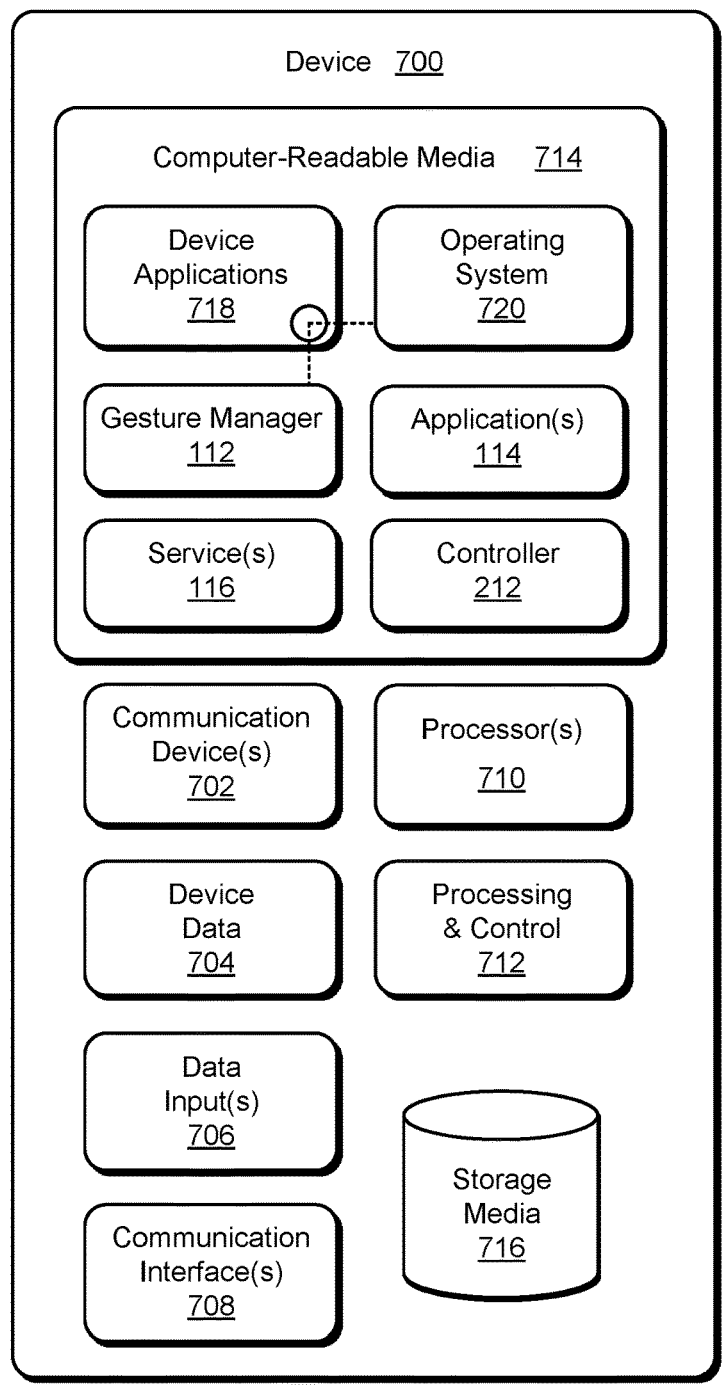
FIG. 7 illustrates various components of an example computing system that can be implemented as any type of client, server, and/or computing device as described with reference to the previous FIGS. 1-6 to implement a haptic feedback mechanism for an interactive garment.

FIG. 7 illustrates various components of an example computing system 700 that can be implemented as any type of client, server, and/or computing device as described with reference to the previous FIGS. 1-6 to implement a haptic feedback structure for an interactive garment. In embodiments, computing system 700 can be implemented as one or a combination of a wired and/or wireless wearable device, System-on-Chip (SoC), and/or as another type of device or portion thereof. Computing system 700 may also be associated with a user (e.g., a person) and/or an entity that operates the device such that a device describes logical devices that include users, software, firmware, and/or a combination of devices.

Computing system 700 includes communication devices 702 that enable wired and/or wireless communication of device data 704 (e.g., received data, data that is being received, data scheduled for broadcast, data packets of the data, etc.). Device data 704 or other device content can include configuration settings of the device, media content stored on the device, and/or information associated with a user of the device. Media content stored on computing system 700 can include any type of audio, video, and/or image data. Computing system 700 includes one or more data inputs 706 via which any type of data, media content, and/or inputs can be received, such as human utterances, touch data generated by interactive fabric 102, user-selectable inputs (explicit or implicit), messages, music, television media content, recorded video content, and any other type of audio, video, and/or image data received from any content and/or data source.

Computing system 700 also includes communication interfaces 708, which can be implemented as any one or more of a serial and/or parallel interface, a wireless interface, any type of network interface, a modem, and as any other type of communication interface. Communication interfaces 708 provide a connection and/or communication links between computing system 700 and a communication network by which other electronic, computing, and communication devices communicate data with computing system 700.

Computing system 700 includes one or more processors 710 (e.g., any of microprocessors, controllers, and the like), which process various computer-executable instructions to control the operation of computing system 700 and to enable techniques for, or in which can be embodied, interactive textiles. Alternatively or in addition, computing system 700 can be implemented with any one or combination of hardware, firmware, or fixed logic circuitry that is implemented in connection with processing and control circuits which are generally identified at 712. Although not shown, computing system 700 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

Computing system 700 also includes computer-readable media 714, such as one or more memory devices that enable persistent and/or non-transitory data storage (i.e., in contrast to mere signal transmission), examples of which include random access memory (RAM), non-volatile memory (e.g., any one or more of a read-only memory (ROM), flash memory, EPROM, EEPROM, etc.), and a disk storage device. A disk storage device may be implemented as any type of magnetic or optical storage device, such as a hard disk drive, a recordable and/or rewriteable compact disc (CD), any type of a digital versatile disc (DVD), and the like. Computing system 700 can also include a mass storage media device 716.

Computer-readable media 714 provides data storage mechanisms to store device data 704, as well as various device applications 718 and any other types of information and/or data related to operational aspects of computing system 700. For example, an operating system 720 can be maintained as a computer application with computer-readable media 714 and executed on processors 710. Device applications 718 may include a device manager, such as any form of a control application, software application, signal-processing and control module, code that is native to a particular device, a hardware abstraction layer for a particular device, and so on.

Device applications 718 also include any system components, engines, or managers to implement a haptic feedback structure for an interactive garment. In this example, device applications 718 include gesture manager 112, application 114, and service 116, and controller 208.

CONCLUSION

Although embodiments of techniques using, and objects including, a haptic feedback structure for an interactive garment have been described in language specific to features and/or methods, it is to be understood that the subject of the appended claims is not necessarily limited to the specific features or methods described. Rather, the specific features and methods are disclosed as example implementations of a haptic feedback structure for an interactive garment.

What is claimed is:

1. An interactive garment comprising:
 a haptic feedback mechanism integrated within the interactive garment, the haptic feedback mechanism comprising a vibration source and a mechanical transmission structure coupled to the vibration source, the mechanical transmission structure including a transmission cable attached to the interactive garment at multiple attachment points and one or more weights attached to the transmission cable between each of one or more pairs of adjacent attachment points of the multiple attachment points; and
 a controller configured to control the haptic feedback mechanism to provide haptic feedback by causing the vibration source to distribute vibration along the transmission cable to multiple vibration points within the mechanical transmission structure by causing the transmission cable to oscillate and the one or more weights to vibrate.

2. The interactive garment as recited in claim 1, wherein the transmission cable comprises a resonant cable.

3. The interactive garment as recited in claim 1, wherein the transmission cable is attached to the interactive garment at the multiple attachment points such that the weights are not attached to the interactive garment.

4. The interactive garment as recited in claim 1, wherein the vibration source comprises a linear actuator.

5. The interactive garment as recited in claim 1, wherein the controller is configured to cause the multiple vibration points to vibrate in response to detection of user input to a sensor integrated within the interactive garment.

6. The interactive garment as recited in claim 1, wherein the interactive garment further comprises an interactive fabric comprising conductive threads integrated into the interactive fabric to form a capacitive touch sensor; and
 wherein the controller is further configured to:
 detect touch-input to the conductive threads when a user wearing the interactive garment touches the conductive threads; and
 provide the haptic feedback in response to detection of the touch-input.

7. The interactive garment as recited in claim 1, wherein the controller is configured to cause the multiple vibration points to vibrate to indicate a notification.

8. The interactive garment as recited in claim 1, wherein:
 the interactive garment comprises a shirt or jacket wearable by a user; and
 the transmission cable is integrated into a sleeve of the shirt or jacket.

9. A computer-implemented method comprising:
 detecting touch-input to conductive threads integrated into interactive fabric of an interactive garment when the conductive threads are touched by a user, the conductive threads forming a touch sensor;

in response to detection of the touch-input, receiving a request to provide haptic feedback in the interactive garment; and providing the haptic feedback in response to receiving the request by causing a vibration source to distribute vibration to a mechanical transmission structure of the interactive garment, the vibration distributed based on the vibration source causing a transmission cable of the mechanical transmission structure to oscillate and multiple weights attached to the transmission cable to vibrate at multiple vibration points of the mechanical transmission structure.

10. The computer-implemented method of claim 9, wherein the vibration source comprises a single vibration motor.

11. The computer-implemented method of claim 9, wherein the request is received to provide haptic feedback indicating detection of user input to a sensor integrated within the interactive garment.

12. The computer-implemented method of claim 9, wherein the request is received to provide haptic feedback indicating a notification.

13. The computer-implemented method as recited in claim 9, further comprising applying the vibration to one end of the transmission cable to cause the transmission cable to oscillate.

14. The computer-implemented method as recited in claim 13, wherein the transmission cable is attached to the interactive garment at multiple attachment points, and wherein the multiple vibration points are on the transmission cable between pairs of attachment points.

15. A haptic feedback mechanism comprising:

a linear actuator configured to cause a transmission cable to vibrate; and a mechanical transmission structure coupled to the linear actuator and configured to distribute vibration from the linear actuator to multiple vibration points of the mechanical transmission structure, the vibration from the linear actuator applied to one end of a transmission cable of the mechanical transmission structure to cause the transmission cable to oscillate, the transmission cable attached to an interactive garment at multiple attachment points, the vibration distributed based on oscillations of the transmission cable causing multiple weights attached to the transmission cable between pairs of the attachment points to vibrate at the multiple vibration points.

16. The haptic feedback mechanism of claim 15, wherein the transmission cable comprises a resonant cable.

17. The haptic feedback mechanism of claim 15, wherein the transmission cable is attached to the interactive garment at the multiple attachment points such that the weights are not attached to the interactive garment.

18. The haptic feedback mechanism of claim 15, wherein the controller is configured to cause the multiple vibration points to vibrate in response to detection of user input to a sensor integrated within the interactive garment.

19. The haptic feedback mechanism of claim 15, wherein the transmission cable comprises a resonant cable.

20. The haptic feedback mechanism of claim 15, wherein one weight of the multiple weights is attached to the transmission cable between each pair of the attachment points.

* * * * *